United States Patent [19]
Griffis

[11] Patent Number: 4,955,410
[45] Date of Patent: Sep. 11, 1990

[54] METHOD AND MEANS FOR REPLACING A MALFUNCTIONING AIR FILTRATION UNIT

[76] Inventor: Steven C. Griffis, 2929 Avenue D, Council Bluffs, Iowa 51501

[21] Appl. No.: 361,999

[22] Filed: Jun. 5, 1989

Related U.S. Application Data

[62] Division of Ser. No. 308,749, Feb. 10, 1989, Pat. No. 4,859,221.

[51] Int. Cl.⁵ .............................................. F16K 11/10
[52] U.S. Cl. ..................................... 139/883; 137/875
[58] Field of Search ................................ 137/883, 875

[56] References Cited

U.S. PATENT DOCUMENTS 1,099,713  6/1914  Morris .................................. 137/883

FOREIGN PATENT DOCUMENTS 69222  11/1925  Australia .
146749  7/1931  Switzerland ........................ 137/883

Primary Examiner—John C. Fox
Attorney, Agent, or Firm—Zarley, McKee, Thomte, Voorhees & Sease

[57] ABSTRACT

A Y-shaped air diverter box is utilized to permit the replacement of a malfunctioning air filtration unit which is being utilized in a contaminated work site area. The Y-shaped air box is utilized in such a manner so as to permit the purging and cleaning of the air conduit which normally connects the air filtration unit to an air exhaust as well as providing a means for cleaning the exhaust side of the new air filtration unit which is being placed into service.

4 Claims, 3 Drawing Sheets

METHOD AND MEANS FOR REPLACING A MALFUNCTIONING AIR FILTRATION UNIT

Cross-Reference to Related Application

This is a divisional application of Ser. No. 308,749 filed Feb. 10, 1989 now U.S. Pat. No. 4,859,221.

BACKGROUND OF THE INVENTION

This is a divisional application of Ser. No. 308,749 filed Feb. 10, 1989. Airborne asbestos contamination in buildings is a significant environmental problem. Various diseases have been linked with industrial exposure to airborne asbestos, and the extensive use of asbestos products in buildings has raised concerns about exposure to asbestos in nonindustrial settings. Surveys conducted by the Environmental Protection Agency (EPA) estimate that asbestos-containing materials can be found in approximately 321,000 schools and 733,000 other public and commercial buildings in this country.

In an effort to avoid the hazards associated with exposure to airborne asbestos, abatement actions or procedures are being extensively conducted and the Environmental Protection Agency has published a booklet entitled "Guidance for Controlling Asbestos-Containing Materials in Buildings."

During the abatement action, one or more air filtration units, usually several air filtration units, are positioned throughout the work site to filter the air in the work place.

Each of the air filtration units include an air inlet or suction opening and an air discharge or outlet opening. The air inlet of the air filtration unit is in communication with the interior of the contaminated space so that the contaminated air is drawn into the filtration unit and then exhausted from the exhaust side of the filtration unit. The exhaust side of the air filtration unit is normally connected by means of a flexible conduit to a selectively closable air exhaust means such as an air box as disclosed in the patent application Ser. No. 179,864 filed Apr. 11, 1988 entitled "Means for Sampling the Exhaust Air of an Air Filtration Unit." In some installations, an air box is not utilized although some form of selectively closable exhaust opening is provided at the end of the flexible air conduit.

A problem of contamination occurs when an air filtration unit malfunctions and must be replaced. When the malfunctioning air filtration unit is disconnected from the air conduit connecting it to the air box, contaminated air enters the interior of the air conduit. Further, when a new air filtration unit is brought into the contaminated area, the exhaust side of the new air filtration unit becomes slightly contaminated itself. If the contaminated exhaust of the air filtration unit is connected to the contaminated air conduit, contaminated air will be discharged into the interior of the air box or the atmosphere when the air filtration unit is actuated.

A problem of contamination also occurs when the primary HEPA filter in a functioning air filtration unit must be replaced. When the dirty primary HEPA filter is removed from the air filtration unit, the downstream side of the unit may become contaminated by the air within the contaminated space. Further, when the new HEPA filter is brought into the contaminated space, the downstream side of the new filter may also become contaminated as it is placed into the air filtration unit.

It is therefore a principal object of the invention to provide a method and means for replacing a malfunctioning air filtration unit.

A further object of the invention is to provide a method and means for replacing a malfunctioning air filtration unit which prevents contamination of the air conduit and air box normally associated therewith.

Yet another object of the invention is to provide a method and means for replacing a malfunctioning air filtration unit through the use of a Y-shaped air box having at least three selectively closable openings.

It is yet another object of the invention to provide a method and means for replacing a primary HEPA filter in a functioning air filtration unit.

These and other objects of the invention will be apparent to those skilled in the art.

SUMMARY OF THE INVENTION

In conventional work sites wherein an asbestos abatement action is being conducted, one or more air filtration units are normally employed to filter the air within the work site and to maintain a negative pressure therein. Ordinarily, the exhaust of each of the air filtration units has a conduit connected thereto which extends to either an air box or some form of exhaust valve arrangement which communicates with the outside atmosphere. If one of the air filtration units malfunctions, it is necessary to take that unit out of service and to install a functioning unit. The instant invention describes a method and means by which a Y-shaped air diverter box is imposed in the conduit so as to permit the conduit to be purged and the exhaust side of the new air filtration unit as well so that contaminated air is not released into the atmosphere. The instant invention also describes a method and means by which the primary HEPA filter may be replaced in an air filtration unit located within a contaminated space.

DESCRIPTION OF THE PREFERRED EMBODIMENT

Figure 1:
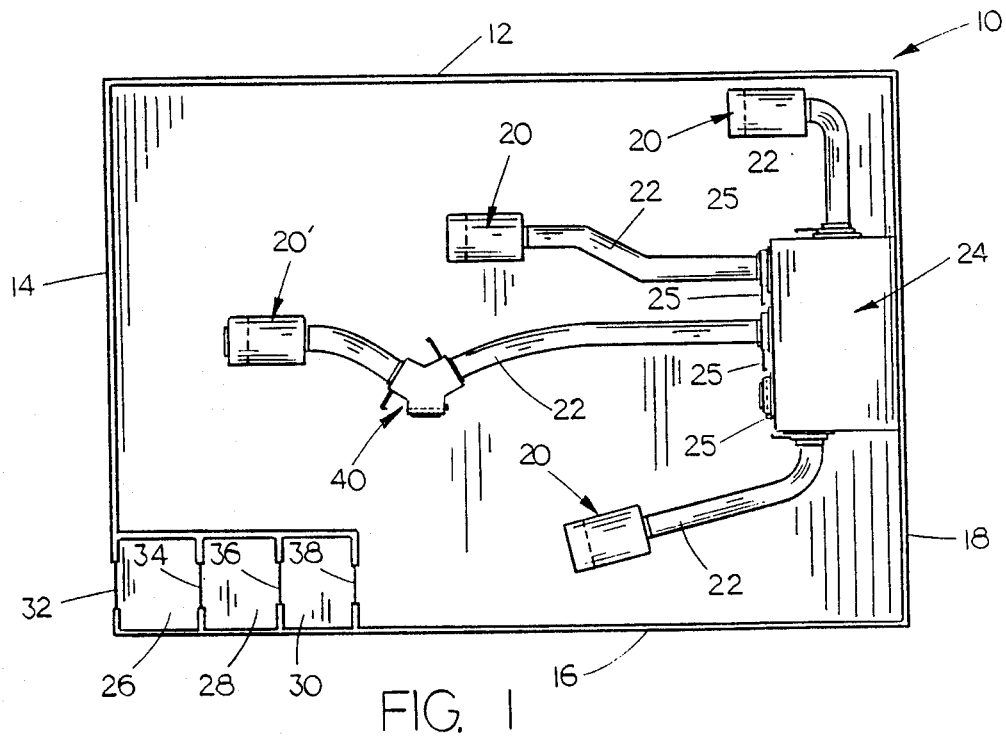
FIG. 1 is a schematic view of a conventional work site wherein an asbestos abatement action is being accomplished and wherein a malfunctioning air filtration unit has been replaced through the use of a Y-shaped air box.

In FIG. 1, the numeral 10 refers to an enclosed space or work area wherein an asbestos abatement action is taking place. Enclosed space 10 is defined by walls 12, 14, 16 and 18. A plurality of air filtration units 20 are mounted within the space 10 and have their exhausts operatively communicating with conduits 22 which, extend to an air box 24 which is in communication with the outside atmosphere. Movable valve members 25 are imposed between the conduits 22 and the air box 24 and are movable between open and closed positions.

A conventional clean room 26, shower room 28 and equipment room 30 are provided having doors 32, 34, 36 and 38 provided therein. The doors 32, 34, 36 and 38 are normally consisted of flexible plastic sheets which permit air to flow from outside the work area 10 into the work area 10 through the doors 32, 34, 26 and 38 but which will prevent the reverse flow of air therethrough. In FIG. 1, the numeral 20, refers to an air filtration unit which has been substituted for a malfunctioning air filtration unit. The numeral 40 refers to a Y-shaped clean air diverter box which is utilized in this invention to replace a malfunctioning air filtration unit without contaminating the outside atmosphere.

Diverter box 40 generally comprises a housing or manifold 42 having openings 44, 46 and 48 provided therein. Housing 42 is provided with slots 50, 52 and 54 which are adapted to receive selectively vertically movable air block plates 56, 58 and 60 therein respectively.

For example, if plate 58 is in its closed position while plates 56 and 60 are in the open position, communication will be permitted through the housing 42 by means of the openings 44 and 48.

Figure 2:
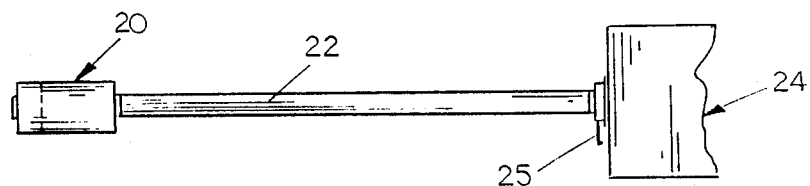
FIGS. 2-9 are plan views which illustrate the sequence or method by which the malfunctioning air filtration unit is replaced.

FIG. 2 illustrates air filtration unit 20 having its exhaust connected to box 24 by conduit 22.

Figure 3:
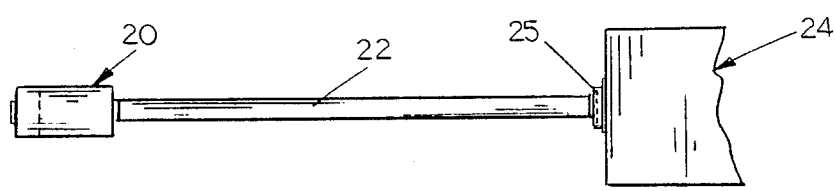
Figure 4:
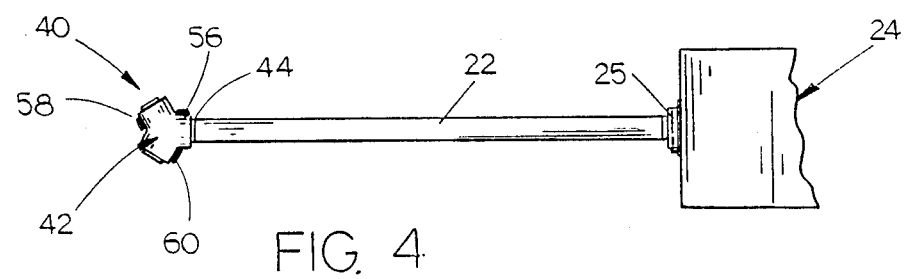

Assuming that the air filtration unit in FIG. 2 malfunctions, it is necessary to replace the same. FIG. 3 illustrates the first step in replacing the malfunctioning air filtration unit 20 wherein valve member 25 is first moved to its closed position. The air filtration unit 20 is then removed from the conduit 22 and the Y-shaped air diverter box 40 is then installed on the conduit 22 s that opening 44 is in communication with the conduit 22. At this point, plates 56, 58 and 60 are in their closed condition.

Figure 5:
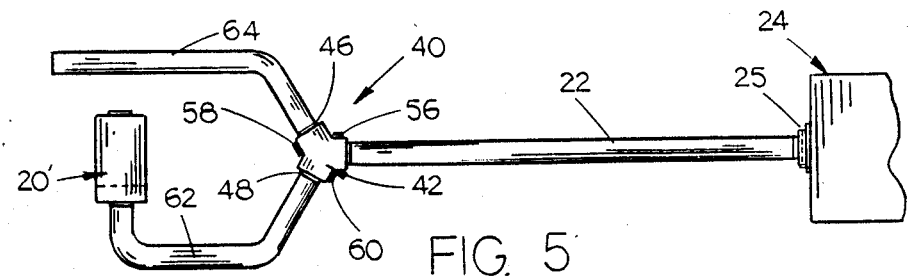
Figure 6:
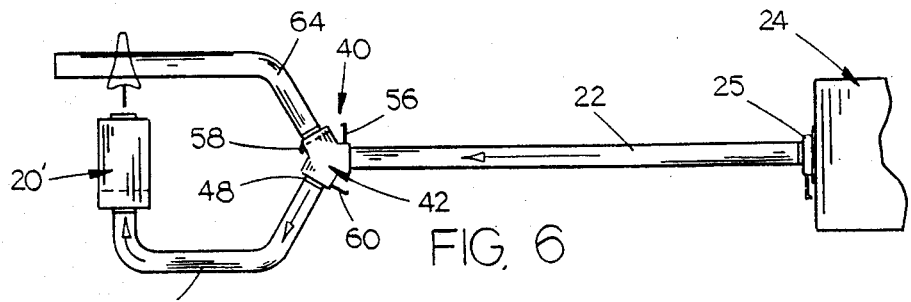
Figure 7:
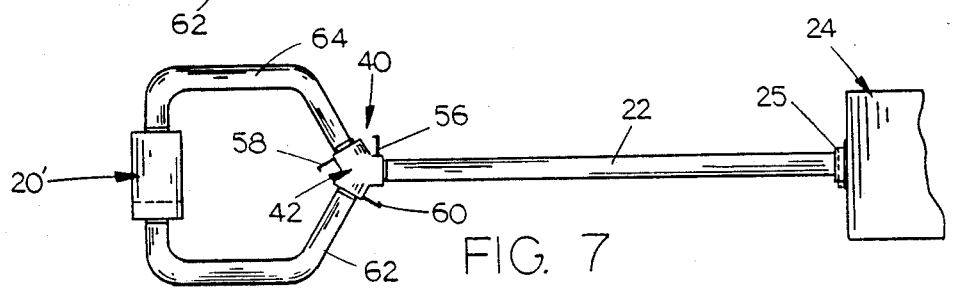
Figure 8:
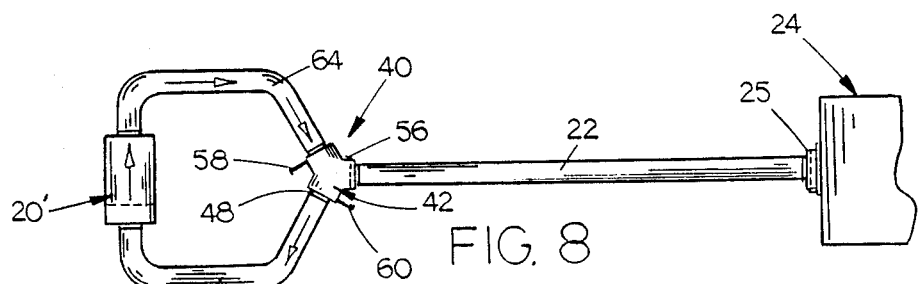

As seen in FIG. 5, a conduit 62 is then connected to opening 48 of air diverter box 40 and a conduit 64 is connected to opening 46 of air diverter box 40. The intake side of a new or functioning air filtration unit 20, is then connected to conduit 62 as seen in FIG. 5. The next step in the operation 10 is to open plates 56 and 60 and open valve member 25 as seen in FIG. 6. As seen in FIG. 6, the air filtration unit 20, is then operated to purge conduit 22, conduit 62 and box 40 with the exhaust of the air filtration unit 20, being discharged into the work site area. After purging conduit 22, and the interior of the box 40, the unit 20, is deactivated and conduit 64 is connected to the discharge side of the air filtration unit 20,. Valve member 25 is then closed with plates 56, 58 and 60 being positioned in the open position as illustrated in FIG. 7. Plate 56 is then closed and the air filtration unit 20, is again 20 activated so that the conduit 62 and 64, as well as the interior of the box 40, are purged and cleaned as illustrated in FIG. 8.

Figure 9:
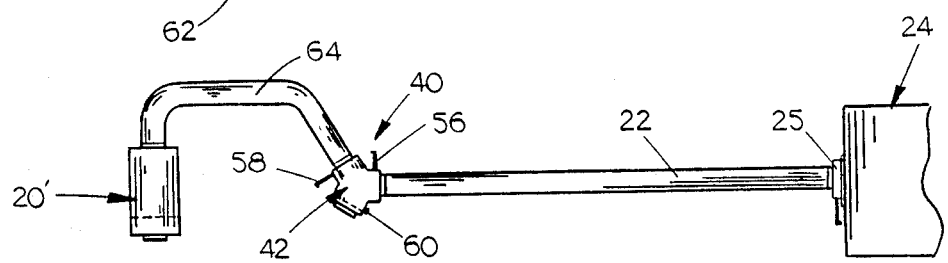
Figure 11:
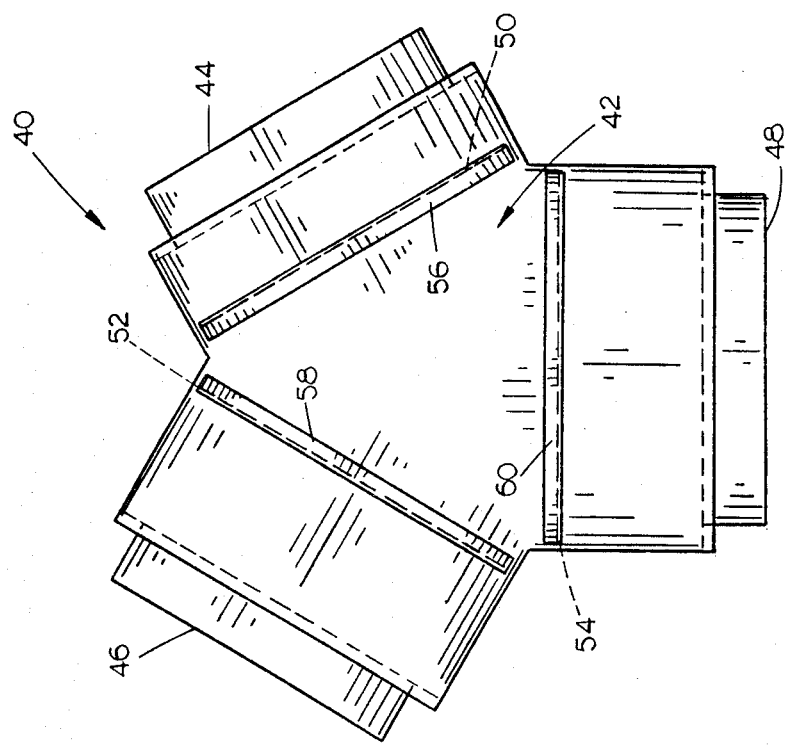
FIG. 11 is a top elevational view of the Y-shaped air box.
Figure 10:
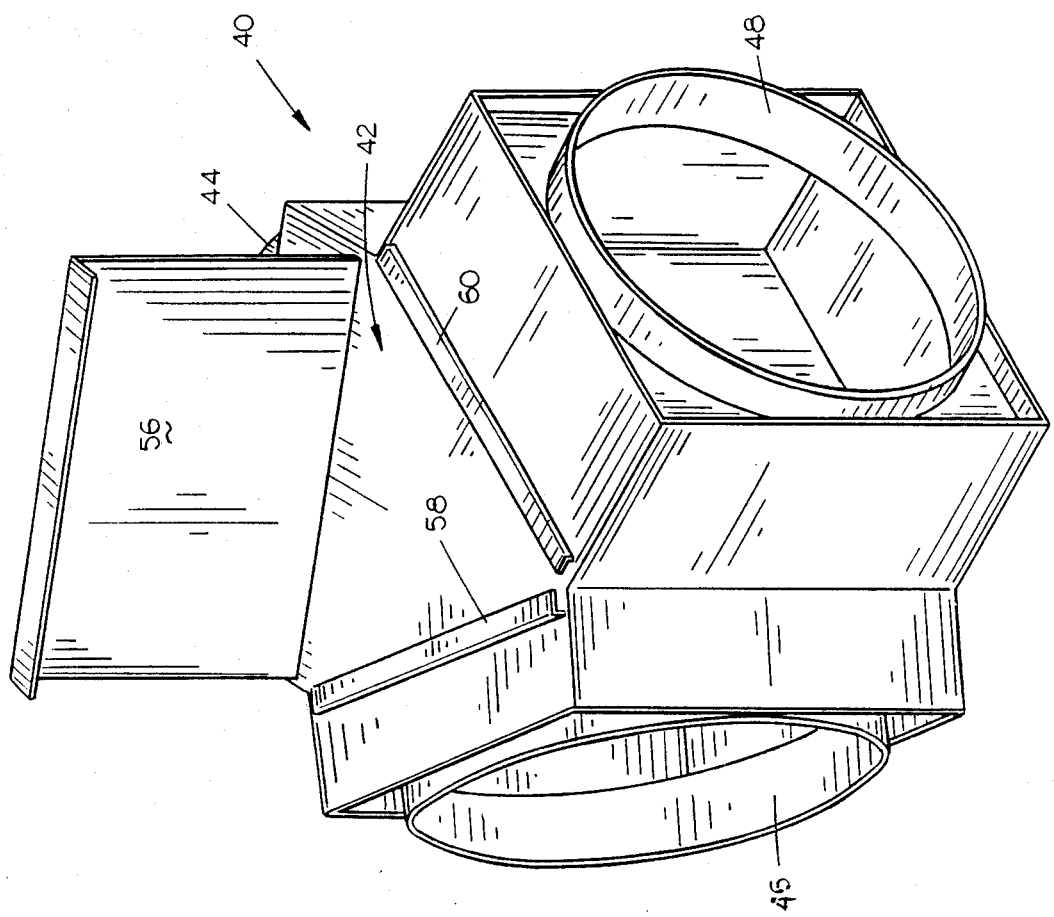
FIG. 10 is a perspective view of the Y-shaped air box.

Plate 60 is then closed as illustrated in FIG. 9 and the conduit 62 is removed from the box 40 and the unit 20, so that the inlet side of the filtration unit 20, communicates with the interior of the work site area. Plate 56 is then opened and valve member 25 is opened so that the exhaust of the air filtration unit 20, communicates with the interior of the air box 24.

Thus it can be seen that through the use of the air box 40 and the method described hereinabove, the interior of conduit 22 is purged and cleaned as is the exhaust of the new air filtration unit 20, prior to air being exhausted into the air box 24, thereby preventing contamination of the atmosphere. The box 40 may also be used to replace the primary HEPA filter in a unit 20 located within the contaminated space. Thus it can be seen that the method and means of this invention accomplishes at least all of its stated objectives.

I claim:
1. In combination,
a malfunctioning air filtration unit located in a contaminated area and having its exhaust normally connected to a first air conduit which extends to a selectively closable air exhaust means,
a Y-shaped air diverter box means having an interior compartment and at least first, second and third openings communicating therewith, said first opening being selectively connected to said first air conduit,
a second air conduit for selective connection to said second opening,
a third air conduit for selective connection to said third opening,
said box means having a selectively movable valve member imposed in each of said first, second and third openings whereby air from said first, second or third conduits may be selectively introduced into the interior of said box means or passed outwardly therethrough.

2. The combination of claim 1 wherein a cylindrical adapter is positioned at each of said openings for removably receiving the end of the associated air conduit.

3. In combination,
an air filtration unit located in a contaminated area and having its exhaust normally connected to a first air conduit which extends to a selectively closable air exhaust means,
a Y-shaped air diverter box means having an interior compartment and at least first, second and third openings communicating therewith, said first opening being selectively connected to said first air conduit,
a second air conduit selectively connected to said second opening,
a third air conduit selectively connected to said third opening,
said box means having a selectively movable valve member imposed in each of said first, second and third openings whereby air from said first, second or third conduits may be selectively introduced into the interior of said box means or passed outwardly therethrough.

4. The combination of claim 3 wherein a cylindrical adapter is positioned at each of said openings for removably receiving the end of the associated air conduit.

* * * * *